(12) United States Patent
El-Maleh

(10) Patent No.: US 10,169,512 B2
(45) Date of Patent: *Jan. 1, 2019

(54) COMPUTER SYSTEM FOR STATE ASSIGNMENTS USING A FINITE STATE MACHINE

(71) Applicant: KING FAHD UNIVERSITY OF PETROLEUM AND MINERALS, Dhahran (SA)

(72) Inventor: Aiman Helmi El-Maleh, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/033,856

(22) Filed: Jul. 12, 2018

(65) Prior Publication Data

US 2018/0336295 A1 Nov. 22, 2018

Related U.S. Application Data

(63) Continuation of application No. 15/216,302, filed on Jul. 21, 2016, now Pat. No. 10,042,965.

(51) Int. Cl.
G06F 9/455 (2018.01)
G06F 17/50 (2006.01)

(52) U.S. Cl.
CPC ................ *G06F 17/505* (2013.01)

(58) Field of Classification Search
USPC ...................................... 716/132
See application file for complete search history.

(56) References Cited

U.S. PATENT DOCUMENTS

| 5,515,292 A * | 5/1996 | Roy ............... G06F 17/5045 716/109 |
| 2004/0093569 A1 | 5/2004 | Colvin, Sr. |
| 2005/0027701 A1 | 2/2005 | Zane |

OTHER PUBLICATIONS

A.E.A. Almaini et al., "State assignment of finite state machines using a genetic algorithm" IEE Proc-Comput Digit Tech, vol. 142, Jul. 1995, pp. 279-286.
B.A. Al Jassani, et al., "State assignment for sequential circuits using multi-objective genetic algorithm" The Institution of Engineering and Technology, 2011, pp. 296-305.

(Continued)

*Primary Examiner* — Eric Lee
(74) *Attorney, Agent, or Firm* — Oblon, McClelland, Maier & Neustadt, L.L.P.

(57) ABSTRACT

A method and system for optimizing state assignments for a finite state machine. The method generates a random initial state assignment for each of a plurality of states of the finite state machine, determines an initial cost associated with the random initial state assignments, identifies a code swap to explore as a function of a code swap probability. Further, the method calculates a cost for the code swap when one or more criteria is satisfied, updates the code swap probability as a function of the cost of the code swap and a best cost, performs the code swap when the cost of the swap is smaller than the best cost and/or a current cost to optimize the state assignments, and outputs optimized state assignments.

6 Claims, 8 Drawing Sheets

(56) References Cited

OTHER PUBLICATIONS

A .El Maleh, "State Assignment for Power Optimization of Sequential Circuits Based on a Probabilistic Pairwise Swap Search Algorithm", IEEE International Symposium on Signal Processing and Information Technology (ISSPIT, 2015, pp. 305-308.
A.El-Maleh, "Majority-Based Evolution state assignment algorithm for area and power optimization of sequential circuits", IET Comput. Digit. Tech. vol. 10 Issue 1, 2016, pp. 30-36.
S.Chaudhury, et al., "Genetic algorithm-based FSM synthesis with area-power tradeoffs" Ntegration, The VLSI Journal 42, 2009, pp. 376-384.
Y. Xia et al, "Genetic algorithm based state assignment for power and area optimisation" IEE Proc.Comput. Digit.Tech., vol. 149 Issue 4, Jul. 2002, pp. 128-133.
S.Sait et al., "FSM State Ecoding for Area and Power Minimization Using Simulated Evolution Algorithm" Journal of Applied Research and Technology, vol. 10, Dec. 2012, pp. 845-858.
V.Salauyou, et al., "FSM State Assignment Methods for Low Power Design" Computer Society, 2007, pp. 1-4.
A. El-Maleh, et al., "Finite State Machine State Assignment for Area and Power Minimizations" ISCAS, 2006, pp. 5303-5306.
A.El Maleh, et al., "Binary particle swarm optimization (BPSO) based state assignment for area minimization of sequential circuits" Applied Soft Computing, vol. 13, 2013, pp. 4832-4840.
M.Yang, "State Assignment for Finite State Machine Synthesis" Journal of Computers, vol. 8 No. 6, Jun. 2013, pp. 1406-1410.

\* cited by examiner

# COMPUTER SYSTEM FOR STATE ASSIGNMENTS USING A FINITE STATE MACHINE

CROSS-REFERENCE TO RELATED APPLICATIONS

The present application is a Continuation of Ser. No. 15/216,302, now allowed, having a filing date of Jul. 21, 2016.

BACKGROUND

Finite State Machines (FSMs) depict behavioral models composed of inputs, states, transitions, and outputs (or actions). Assigning binary codes to the symbolic state values of a finite state machine is a complex problem. State assignment (SA) for FSMs has a significant impact on the area and power of synthesized sequential circuits.

The foregoing description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a method for optimizing state assignments for a finite state machine that generates a random initial state assignment for each of a plurality of states of the finite state machine, determines an initial cost associated with the random initial state assignments, identifies a code swap to explore as a function of a code swap probability. Further, the method calculates a cost for the code swap when one or more criteria is satisfied, updates the code swap probability as a function of the cost of the code swap and a best cost, performs the code swap when the cost of the swap is smaller than the best cost and/or a current cost to optimize the state assignments, and outputs optimized state assignments.

The foregoing paragraph has been provided by way of general introduction, and is not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1A:
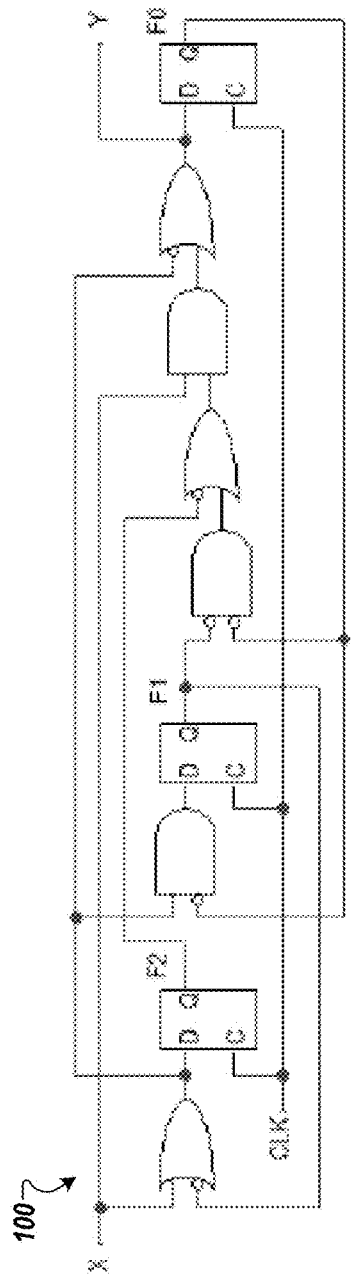
FIG. 1(A) is a schematic that shows a first multi-level circuit according to one example.

Referring now to the drawings, wherein like reference numerals designate identical or corresponding parts throughout several views, the following description relates to systems and methods for optimizing a finite state machine (FSM).

The availability of efficient synthesis tools that can optimize circuits for a given design objective is essential to cope with the complexity of existing designs. Digital systems are composed of data path blocks that perform the needed operations and control blocks that derive the control signals. The behavior of control blocks is modeled as a finite state machine (FSM). A crucial step in the synthesis of sequential circuits is state assignment or state encoding which assigns unique binary codes to each state in the FSM. A state assignment has a significant impact on the area and power of the synthesized sequential circuit. The minimum number of bits required for each state code is $\lceil \log_2 |S| \rceil$, where $|S|$ is the number of states in the FSM.

Deterministic algorithms have been developed to solve the state assignment problem targeting the optimization of the area and power of two-level and multi-level circuits. The objective used in optimizing the area of two-level circuits is the number of Sum of Product (SOP) terms in the resulting circuit, while the objective used in optimizing the area of multi-level circuits is the number of literals (i.e., variables in true or complement form) in the expressions of the synthesized circuit. For power optimization, the main criteria used is to reduce the switching probability of flip-flops as this has a significant impact on reducing the switching probability of all gates in the circuit and hence reducing its power.

Existing deterministic techniques targeting state encoding for area optimization of two-level circuits such as KISS (Keep Internal States Simple) and NOVA are based on symbolic minimization of the state table utilizing covering and disjunctive relations followed by solving an encoding constraint matrix as described in G. DeMicheli, R. K. Brayton, A. Sangiovanni Vincenteli, "Optimal state assignment for Finite State Machines", *IEEE Transactions on Computer-Aided Design of Integrated Circuits and Systems*, vol. 4, pp. 269-285, 1985; and T. Villa, A. Sangiovanni-Vincentelli, "Nova: State assignment of finite state machines for optimal two-level logic implementations", 26th *ACM/IEEE conference on Design automation conference*, pp. 327-332, 1989. Deterministic techniques targeting state encoding for area optimization of multi-level circuits such as MUSTANG, JEDI, and MUSE are based on heuristics that try to maximize factoring of expressions to reduce the number of literals in the resulting multilevel circuit as described in S. Devadas, H. T. Ma, A. R. Newton, A. Sangiovanni-Vincentelli, "MUSTANG: State Assignment of Finite State Machines for Optimal Multi-Level Logic Implementations", *IEEE Transactions on Computer-Aided Design* of Integrated Circuits and Systems, vol. 7, pp. 1290-1300, 1988; B. Lin, A. R. Newton, "Synthesis of multiple-level logic from symbolic high-level description languages", *IFIP International Conference on Very Large Scale Integration*, pp. 187-196, 1989; and X. Du, G. Hachtel, B. Lin, A. R. Newton, "MUSE: A Multilevel symbolic encoding algorithm for state assignment", *IEEE Transactions on Computer-Aided Design of Integrated Circuits and Systems*, vol. 10, pp. 28-38, 1991.

Deterministic techniques targeting state encoding for power optimization are based on minimizing the switching probabilities of flip flops as described in V. Salauyou, T. Grzes, "FSM State Assignment Methods for Low-Power Design", *6th International Conference on Computer Information Systems and Industrial Management Applications*, pp. 345-350, 2007; and A. Sagahyroon, F. A. Aloul, A. Sudnitson, "Low power state assignment using ILP techniques", 15*th IEEE Mediterranean Electrotechnical Conference*, pp. 850-855, 2010. While existing deterministic techniques provide good solutions, they are far from being optimal.

Due to the complexity of the state assignment problem and the limitations of existing deterministic algorithms, non-deterministic evolutionary algorithms have been employed to solve it. These include Genetic Algorithm (GA), Simulated Annealing (SA), Tabu Search (TS), Simulation Evolution (SimE), Binary Particle Swarm Optimization (BPSO), Cuckoo Search Optimization (CSO), Majority-Based Evolution (MBE) and others as described in J. Amaral, K. Turner, J. Ghosh, "Designing Genetic Algorithm for State Assignment Problem", *IEEE TRANSACTIONS ON SYSTEMS, MAN, AND CYBERNETICS*, vol. 25, pp. 659-694, 1995; A. E. A. Almaini, J. F. Miller, P. Thomson, S. Billina, "State assignment of finite state machines using a genetic algorithm: *IEE Computers and Digital Techniques*, vol. 142, pp. 279-286, 1995; A. El-Maleh, S. M. Sait, F. N. Khan, "Finite state machine state assignment for area and power minimization", *IEEE International Symposium on Circuits and Systems*, pp. 5303-5306, 2006; Y Xia, A. E. A. Almaini, "Genetic algorithm based state assignment for power and area optimization", *IEE Computers and Digital Techniques*, vol. 149, pp. 128-133, 2002; S. Chattopadhyay, A. Chetry, S. Biswas, "State assignment and selection of types and polarities of flip-flops, for finite state machine synthesis", *IEEE INDICON, pp.* 27-30, 2004; S. N. Pradhan, M. T. Kumar, S. Chattopadhyay, "Integrated Power-Gating and State Assignment for Low Power FSM Synthesis", *IEEE Computer Society Annual Symposium on VLSI*, pp. 269-274, April, 2008; S. Chaudhury, K. T. Sistla, S. Chattopadhyay, "Genetic algorithm-based FSM synthesis with area-power trade-offs", *Integration, the VLSI Journal*, vol. 42, pp. 376-384, 2009; B. A. Al Jassani, N. Urquhart, A. E. A. Almaini, "State assignment for sequential circuits using multi-objective genetic algorithm", *IET Computers & Digital Techniques*, vol. 5, pp. 296-305, 2011; W. M. Aly, "Solving the state assignment problem using stochstic search aided with simulated annealing", *American Journal of Engineering and Applied Sciences*, vol. 2, pp. 703-707, 2009; M. Yang, "State Assignment for Finite State Machine Synthesis", *Journal of Computers*, vol. 8, pp. 1406-1410, 2013; F. N. Khan, "FSM State Assignment for Area, Power and Testability using Non-Deterministic Evolutionary Heuristics", Master's thesis, KFUPM, Saudi Arabia, 2005; F. C. Oughali, S. M. Sait, A. M. Arafeh, "FSM State-Encoding for Area and Power Minimization Using Simulated Evolution Algorithm", *Journal of Applied Research and Technology*, vol. 10, pp. 845-858, 2012; A. H. El-Maleh, A. T. Sheikh, S. M. Sait, "Binary Particle Swami Optimization (BPSO) Based State Assignment for Area Minimization of Sequential Circuits", *Applied Soft Computing*, vol. 13, pp. 4832-4840, 2013; A. H. El-Maleh, S. M. Sait, A. Bala, "Cuckoo Search Optimization in State Assignment for Area Minimization of Sequential Circuits", *Computers and Electrical Engineering*, vol. 44, pp. 13-23, 2015; A. H. El-Maleh, "Majority-Based Evolution State Assignment Algorithm for Area and Power Optimization of Sequential Circuits", *IET Computers & Digital Techniques,* 2015; M. Chyzy, W. Kosinski, "Evolutionary algorithm for state assignment of finite machines", *Euromicro Symposium on Digital System Design*, pp. 359-362, 2002; and N. Nedjah, L. de Macedo Mourelle, "Evolutionary synthesis of synchronous finite state machines", *International Conference on Computer Engineering and Systems*, pp. 19-24, 2006.

Described herein is a probabilistic pairwise swap search (PPSS) state assignment algorithm. The algorithm is based on assigning probabilities for each pair of code swaps and exploring pairwise code swaps probabilistically. These probabilities are updated based on the relative deviation of the cost of an explored code swap from a best cost in comparison to an average cost deviation. As the algorithm continues exploration, potentially useful code swaps may get high code swap probabilities, which may increase the chance of the useful code swaps of being explored in subsequent iterations. Due to the fixed number of code swaps to be explored in each iteration, the algorithm explores code swaps in a gradual manner such that code swaps with high probability are explored before those with lower probability. The algorithm may employ the use of Tabu lists to diversify search exploration and may perform hill climbing when the solution does not improve by accepting the code swap that results in the next best solution from a current solution. The method described herein is applied for state encoding of FSMs with the objective of optimizing both area and power of the synthesized sequential circuits. To illustrate the capabilities of the system and methodologies described herein, exemplary results are presented. The method described herein is compared with deterministic and other evolutionary algorithms.

The State Assignment (SA) of an FSM maps a state symbol to an encoding described by f: S→B$^n$, where n is the code length, n≥⌈$\log_2$|S|⌉, B$^n$ is an n-dimensional Boolean hypercube and |S| is the number of states. To encode S states using n bits, the number of possible state assignment combinations is given by Eq. (1).

$$\frac{(2^n)!}{(2^n - |S|)!} \qquad (1)$$

For example, if an FSM has 10 states, then each state requires 4 bits for unique encoding. Exhaustively assigning each combination of code among all possible codes and looking for the one that optimizes a given objective requires exorbitant computational time. The SA of a FSM is an NP (nondeterministic-polynomial time)-hard problem, which implies exponential complexity in the worst case as described in S. M. Sait, H. Youssef, "Iterative Computer Algorithms with Applications in Engineering: Solving Combinatorial Optimization Problems", *IEEE Computer Society Press*, California, December 1999, incorporated herein by reference in its entirety.

Table 1 shows an exemplary state assignment problem. The example describes the states of the FSM, their transition to the next state and the output produced during transition from one state to another depending on the input value. To understand the example in Table 1, consider the case when Present State=S2. If input X=0, then Next State=S4 and Output=0, but if X=1, then Next State=S3 and Output=1.

TABLE 1

An example of an FSM.

| Present State | Next state | | Output | |
|---|---|---|---|---|
| | X = 0 | X = 1 | X = 0 | X = 1 |
| S0 | S2 | S2 | 0 | 0 |
| S1 | S2 | S0 | 0 | 1 |
| S2 | S4 | S3 | 0 | 1 |
| S3 | S1 | S2 | 1 | 0 |
| S4 | S1 | S4 | 1 | 0 |

Since there are 5 states, a 3-bit code is sufficient for encoding each state. Table 2 shows two different state assignments labeled as "Ass. 1" and "Ass. 2". The resulting area cost, i.e., the number of literals, is 10 for "Ass. 1" and 20 for "Ass. 2". "Ass. 1" has a significantly smaller area in comparison to "Ass. 2". The number of literals is a cost measure that correlates with the number of transistors in the circuit. For example, the equation $Y = \overline{XF2} + \overline{XF2FI}$ has 5 literals.

TABLE 2

State assignments with resulting area cost.

| State | Ass. 1 | Ass. 2 |
|---|---|---|
| S0 | 101 | 111 |
| S1 | 001 | 000 |
| S2 | 100 | 011 |
| S3 | 111 | 101 |
| S4 | 110 | 100 |
| Area (No. of Literals) | 10 | 20 |

Figure 1B:
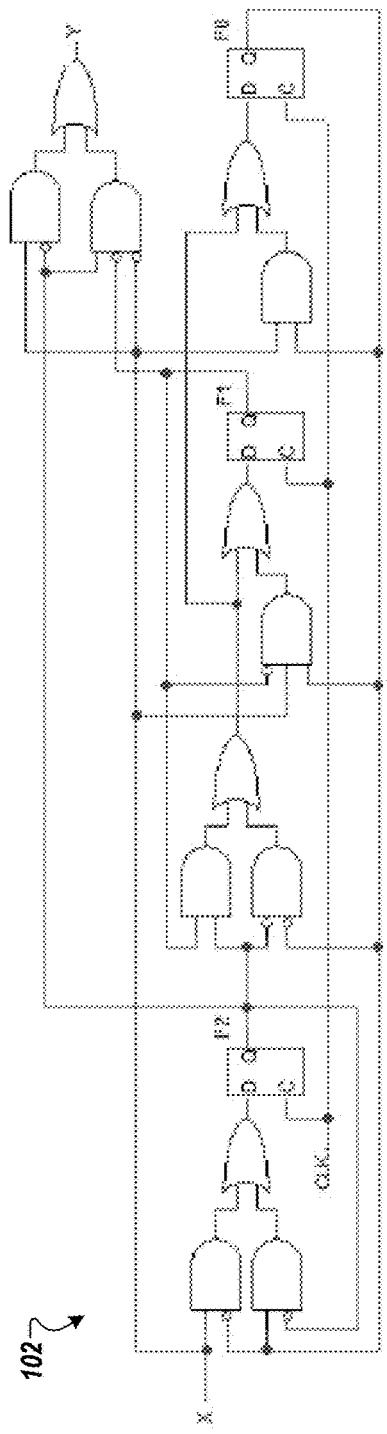
FIG. 1(B) is a schematic that shows a second multi-level circuit according to one example.

FIGS. 1(A) and 1(B) are schematics that show multi-level circuits according to one example. In particular, FIG. 1(A) shows a first multi-level circuit 100 resulting from synthesizing the FSM example using "Ass. 1" and FIG. 1(B) shows a second multilevel circuit 102 resulting from synthesizing the FSM using "Ass. 2". FIGS. 1(A) and 1(B) demonstrate the significant impact of state assignment on the area of a synthesized sequential circuit.

Figure 2:
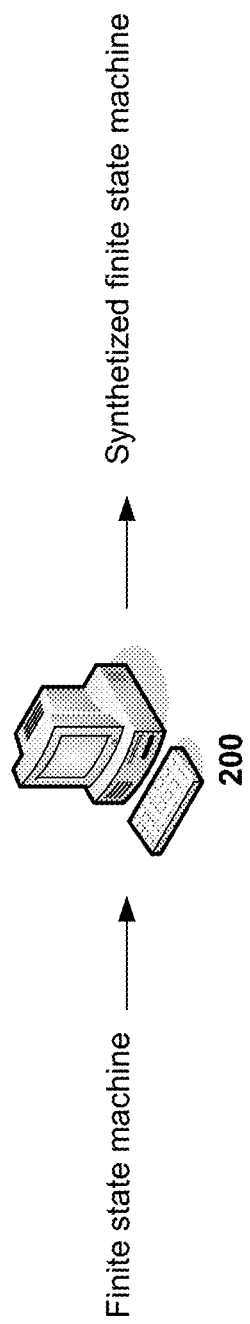
FIG. 2 is a schematic diagram of a system for optimizing state encoding according to one example.
Figure 6:
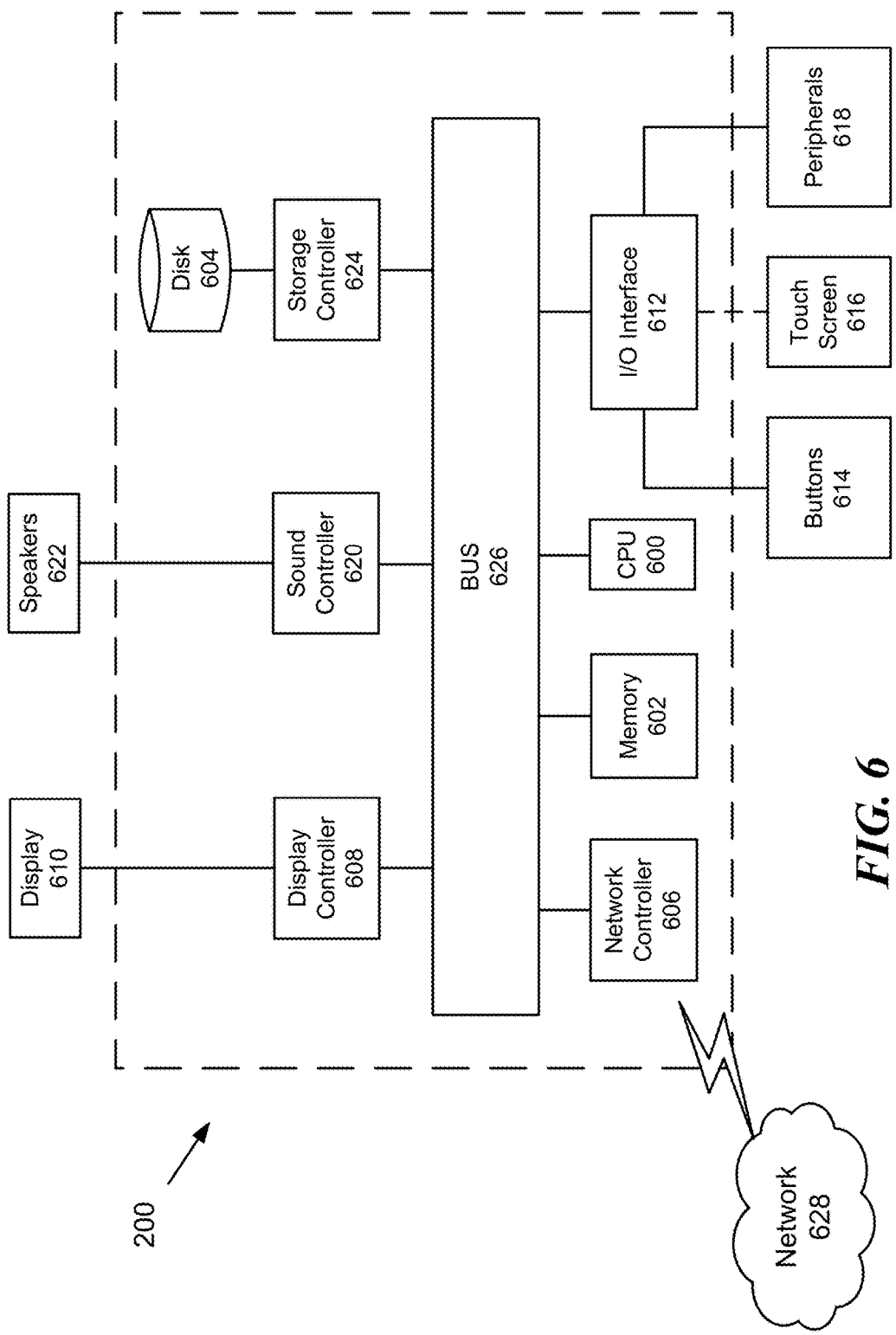
FIG. 6 is an exemplary block diagram of a computer according to one example.

FIG. 2 is a schematic diagram of a computer system 200 for optimizing state encoding according to one example. In one aspect, the systems and methods described herein may be implemented using the computer system 200. The computer 200 may include a CPU 600 and a memory 602 as shown in FIG. 6.

Described herein is a probabilistic pairwise swap search (PPSS) algorithm for solving the state assignment problem. A state assignment solution is represented by assigning unique codes for all states of an FSM. Given m states and n codes, where n≥m, the n codes may be arranged such that the first m codes may be assigned to the m states. During solution optimization, the position of states is assumed fixed while the position of codes change. The size of a solution representation, in bits, is the number of bits required to encode each state in a FSM times the number of all possible state codes. Table 3 shows an example of a state assignment solution representation which has five states, S1 to S4, and eight 3-bit codes, C1 to C7. Swapping code i and j means swapping the i'th and the j'th codes. For example, swapping code 0 (C0) and code 2 (C2) results in state S0 having the code 000 and state S2 having the code 100.

TABLE 3

An example of a state assignment solution representation.

| C0 | C1 | C2 | C3 | C4 | C5 | C6 | C7 |
|---|---|---|---|---|---|---|---|
| 100 | 001 | 000 | 110 | 011 | 010 | 101 | 111 |
| S0 | S1 | S2 | S3 | S4 | | | |

Algorithm 1 shows the pseudo code of the PPSS method. The algorithm maintains two Tabu lists, a first tabu list Tabu1 and a second tabu Tabu2. The first Tabu list Tabu1 saves the last num1 solutions obtained based on the last num1 taken code swaps from the best solution wherein num1 represents a first predetermined number. For example, the first predetermined number may be equal to ten. A taken code swap is a swap that produces a cost smaller than the cost of the current solution or a swap performed due to hill climbing when the current solution could not be improved. The second Tabu list Tabu2 saves the indices of the last num2 code swaps (i, j) taken due to hill climbing wherein num2 is a second predetermined number. In one example, num2 is equal to sixty.

The algorithm starts by generating a random solution with valid state encodings and computes its cost, called cost1. The initial solution is saved, for example in memory 602, as the best cost solution and its cost is saved in bcost. The algorithm goes over iterative rounds where for each round every pair of codes is explored probabilistically depending on a code swap probability between every pair of codes i and j (PCS[i][i]). These probabilities may be initialized to 0.5. In certain aspects, the probabilities may be initialized to other values as would be understood by one of ordinary skill in the art. The pairwise code swap exploration is done through two for loops as shown in lines 11 and 13 of the algorithm. The second loop initializes j with i+1 if the current solution has not improved during the code swap exploration in the current round (indicated by iflag1), otherwise j is initialized with 0. This is because exploring the code swap (i, j) is the same as exploring the code swap (j, i) if the current solution has not changed.

The algorithm may treat the first round differently from subsequent rounds. The first round is marked by the variable f round. For all rounds other than the first round, the number of code swaps explored is limited by swsize, which may be initialized to 4n, where n is the number of state codes. In addition, code swaps are explored by exploring first the code swaps whose probability is in the range [0.9, 1], followed by those in the range [0.8, 0.9] and so on. The variable tv is used to mark the code swap probability range [tv−0.1, tv] to be explored and is initialized to 1 and gets decremented by a predetermined value (e.g., 0.1) in each pairwise code swap iteration (i.e., going over the two for loops). In certain aspects, other ranges may be used (e.g., [0.95, 1], [0.9, 0.95], and so on) as would be understood by one of ordinary skill in the art. This gives the algorithm the advantage of exploring potentially useful code swaps first as the number of code swaps attempted in each iteration is limited by swsize. However, in the first round the algorithm explores all code swaps probabilistically without any limit to the number of swaps performed and without using the gradual code swap probability ranges, [tv−0.1, tv], until the complete round is finished.

```
Algorithm 1 Probabilistic pairwise swap search state assignment algorithm.
─────────────────────────────────────────────────────────────────────────
 1: Tabu1size = 10, Tabu2size = 5, n:number of state codes, swsize = 4n, Maxswap = 64 * 350,
    swcount = 0, ns = 0
 2: Tabu1: List of last Tabu1size solutions obtained from best solution
 3: Tabu2: List of last Tabu2size hill climb code swaps made from best solution
 4: Generate a valid random solution, cost1=cost of current solution, bcost = cost1
 5: Initialize code swap probabilities PCS[ ][ ] to 0.5, initialize swap done flags Done[ ][ ] to 0
 6: fround = 1, iflag2 = 0, repeat = 0, nbest = 2³¹ − 1, nhc = 0, totaldiff = 0, diffcount = 0
 7: while (ns < Maxswap) do
 8:     Start_Label : tv = 1
 9:     while (tv > 0) do
10:         iflag1 = 0
11:         for (i = 0; i < no_of_states and ns < Maxswap; i++) do
12:             if (iflag1 = 1) then start = 0 else start = i + 1 end if
13:             for (j = start; j < n and ns < Maxswap; j++) do
14:                 generate a random number r ∈ [0, 1]
15:                 if ( (i ≠ j) and (PCS[i][j] ≥ r) and (Done[i][j] = 0) and (fround=1 or
    (swcount < swsize and tv − 0.1 < PCS[i][j] ≤ tv)) and (swap(i,j) solution ∉ Tabu1) and
    (repeat = 0 or {repeat = 1 and (tv > gtv or [tv = gtv and (i < gi or (i = gi and j < gj))])}) )
    then
16:                     cost2 =cost of swap(i,j) solution, Done[i][j]=1, swcount++, ns++
17:                     Update_PCS(i,j)
18:                     if (cost2 < bcost) then
19:                         cost11 = cost2, bcost = cost2, update current & best solution
20:                         iflag1 = 1, iflag2 = 0, Done[ ][ ] = 0, swcount = 0, Update_PCS(i,j)
21:                         Tabu2size = 5, reset Tabu2 list, initialize Tabu1 list with best solution
22:                         repeat = 0, nbest = 2³¹ − 1, nhc = 0, totaldiff = 0, diffcount = 0
23:                         if (swsize > 4n) then swsize = swsize − n end if
24:                         if (fround = 0) then Goto Start_Label end if
25:                     else if (cost2 < cost1) then
26:                         cost11 = cost2, gi = i, gj = j, gtv = tv, update current solution
27:                         Update Tabu1 list, Update_PCS2(i,j)
28:                         iflag1 = 1, iflag2 = 1, repeat = 0, nbest = 2³¹ − 1
29:                     else if (cost2 < nbest and cost2 > cost1 and (i,j) ∉ Tabu2) then
30:                         nbest = cost2, nbi = i, nbj = j, save next best solution
31:                     end if
32:                 end if
33:             end for
34:         end for
35:         if (fround = 1) then tv = 0 else tv = tv − 0.1 end if
36:     end while
37:     fround = 0
38:     if (iflag2 = 1) then
39:         repeat = 1
40:     else if (iflag1 = 0) then
41:         copy next best solution into current solution, c1 = nbest, nhc++, nbest = 2³¹ − 1
42:         Update Tabu1 and Tabu2 lists, repeat = 0, Update_PCS2(nbi,nbj)
43:         if (nhc ≥ 10 and nhc%10 == 0) then
44:             Update_Par( ), Reset_Prob( )
45:         end if
46:     end if
47:     iflag2 = 0, swcount = 0, Done[ ][ ] = 0
48: end while
```

For each code swap exploration, the algorithm generates a random number in a predefined range for example, r∈[0, 1] and if the code swap probability between codes i and j is greater than or equal to the random number r, the code swap has not been explored in this round, indicated by checking that Done[i][j]=0, the algorithm is either in the first round or the number of swaps performed in the round, swcount, is smaller than swsize and the code swap probability is in the range [tv−0.1, tv], the solution generated from the code swap is not in Tabu1 list, and the round is not repeated (repeat=0) or the round is repeated with other conditions are satisfied as described later herein, then the code swap i and j is explored and the cost of the resulting solution is calculated, called cost2. Then, the code swap probability between codes i and j is updated using Update_PCS function. This is done by calculating the percentage difference between cost2 and bcost. Then the percentage difference is compared with the average difference from all explored solutions form the best solution found. Depending on how smaller or bigger the percentage difference is from the average difference, the code swap probability is updated as shown in Algorithm 2.

In one aspect, if the difference is ≥3 times the average difference, the code swap probability is reduced by 0.45. If the difference is ≥0.9 and <1.03125 the average difference, then the code swap probability is computed as 0.5*PCS[i][j]+0.25. The rational is to make the code swap probability closer to 0.5. For example, if the code swap probability was 0.5, it remains as 0.5. However, if it was 0.75, it is reduced to 0.625 and if it was 0.25, it is increased to 0.375. If the updated code swap probability becomes greater than 1, it is set to 1 and if it becomes less than or equal to 0, it is set to 0.01. This is to allow a chance for these code swaps to be explored again with a small probability.

```
Algorithm 2 Update_PCS(i, j) function.
──────────────────────────────────────
1: diff = (cost2 − bcost)/bcost
2: totaldiff = totaldiff + diff, diffcount++, avgdiff= totaldiff/diffcount
3: if (diff ≥ 3*avgdiff) then PPCS[i][j]=PCS[i][j]−0.45
4: else if (diff ≥ 2.5*avgdiff) then PCS[i][j]=PCS[i][j]−0.40
5: else if (diff ≥ 2.0*avgdiff) then PCS[i][j]=PCS[i][j]−0.35
```

Algorithm 2 Update_PCS(i, j) function.

```
 6: else if (diff ≥ 1.5*avgdiff) then PCS[i][j]=PCS[i][j]-0.30
 7: else if (diff ≥ 1.25*avgdiff) then PCS[i][j]=PCS[i][j]-0.25
 8: else if (diff ≥ 1.125*avgdiff) then PCS[i][j]=PCS[i][j]-0.20
 9: else if (diff ≥ 1.0625*avgdiff) then PCS[i][j]=PCS[i][j]-0.15
10: else if (diff ≥ 1.03125*avgdiff) then PCS[i][j]=PCS[i][j]-0.10
11: else if (diff ≥ 0.9*avgdiff) then PCS[i][j]=0.5*PCS[i][j]+0.25
12: else if (diff ≥ 0.8*avgdiff) then PCS[i][j]=0.5*PCS[i][j]+0.30
13: else if (diff ≥ 0.7*avgdiff) then PCS[i][j]=0.5*PCS[i][j]+0.35
14: else if (diff ≥ 0.6*avgdiff) then PCS[i][j]=0.5*PCS[i][j]+0.40
15: else if (diff ≥ 0.5*avgdiff) then PCS[i][j]=0.5*PCS[i][j]+0.45
16: else if (diff ≥ 0.33*avgdiff) then PCS[i][j]=0.5*PCS[i][j]+0.50
17: else if (diff ≥ 0.25*avgdiff) then PCS[i][j]=0.5*PCS[i][j]+0.55
18: else if (diff ≥ 0.20*avgdiff) then PCS[i][j]=0.5*PCS[i][j]+0.60
19: else if (diff ≥ 0) then PCS[i][j]=0.5*PCS[i][j]+0.65
20: end if
21: if (PCS[i][j]>1) then PCS[i][j]=1
22: else if (PCS[i][j]≤0) then PCS[i][j]=0.01
23: end if
```

If the cost of the explored solution is smaller than the cost of the best solution (cost2<bcost), then the current and best solutions and the current and best costs are updated and an improvement flag, iflag1, is set to 1 to indicate that the current solution has improved. In addition, Done[ ][ ] flags are reset to 0 as all code swaps should be allowed to be explored after the solution has improved. Furthermore, Tabu1 is initialized with the best solution while Tabu2 list is reset and its size is set back to 5. A number of variables are reset to 0 including swcount, number of hill climbs (nhc), a second improvement flag (iflag2), totaldif f and diff count. If swsize>4n, it will be updated to swsize-n. The algorithm maintains two improvement flags, a first flag iflag1 and a second flag iflag2. The first flag iflag1 is set to 1 whenever the current solution improves. The first flag is reset in the beginning of every pairwise code swap exploration iteration so that an improvement within this iteration for code swap probabilities in the range [tv−0.1, tv] is detected. This is needed to decide whether in the second for loop j starts from 0 or from i+1. The second flag, iflag2, is set only when the swap results in a solution that is better than the current solution but worse than the best solution. This situation may occur due to taking hill climbs during solution exploration as described later herein. The second flag iflag2 is used to indicate such kind of improvement in the solution and is used to decide whether a round is repeated or not. The second flag iflag2 is reset to 0 if the best solution improves or the algorithm starts a new round of exploration.

Since the current solution has changed, the code swap probability is updated using Update_PCS2 function, given in Algorithm 3. The code swap probability of codes i and j is set to 0.5. However, for all other codes k other than i and j, the code swap probability PCS[i] [k] is updated as 0.5*PCS[j] [k]+0.25 and the code swap probability PCS[j] [k] is updated as 0.5*PCS[i] [k]+0.25. This gives half the weight to the previous code swap probability and adds 0.25 to that. The rational for this is that the state assigned to code i due to swapping codes i and k before or after swapping codes i and j is assigned code k. The same argument applies due to swapping codes j and k. Thus, half the weight is given to the original code swap probability. If the algorithm is not in the first round, the algorithm restarts the round by going to Start Label where the algorithm starts exploring code swaps with those whose swap probabilities are in the range [0.9, 1] by setting tv=1.

Algorithm 3 Update_PCS2(i, j) function.

```
1: PCS[i][j] = 0.5
2: for (k = 0; k < n; k++) do
3:    if (k ≠ i) and (k ≠ j) then
4:       temp = 0.5*PCS[i][k]+0.25
5:       PCS[i][k] = 0.5*PCS[j][k]+0.25
6:       PCS[j][k] = temp
7:    end if
8: end for
```

If the cost of the explored solution, cost2, is not smaller than the best cost but is smaller than the cost of the current solution, cost1, then the swap is taken and the current solution is updated with the new solution resulting from performing the code swap and is added to Tabu1 list. The code swap probability of codes i and j is updated using Update PCS2 function. The algorithm stores the indices of the ith and jth codes swapped and the tv value that resulted in the new solution in gi, gj and gtv variables in the memory 602. The algorithm may repeat the round exploring all code swaps until the code swap that has resulted in improving the cost of the current solution. This may be done by checking the condition {repeat=1 and (tv>gtv or [tv=gtv and (i<gi or (i=gi and j<gh)])}), where the repeat variable is used to indicate that the round is repeated. The situation that cost2<cost1 can happen when a hill climb is made accepting a code swap that results in a solution that has worse cost than the cost of the current solution.

While exploring code swaps, the algorithm keeps track of the next best solution from the current solution. This is done by the condition (cost2<nbest and cost2>cost1 and (i, j) ∉Tabu2), where the cost of the next best solution is stored in a first variable nbest and the code indices that result in the next best solution are stored in a second nbi and third nbj variables respectively. The next best solution is used to perform a hill climb by replacing the current solution with the next best solution when the current solution does not improve after finishing a round. After performing a hill climb by injecting the next best solution, Tabu1 and Tabu2 lists are updated and the code swap probabilities are updated using function Update_PCS2(nbi; nbj).

Tabu2 list is used to ensure that the code swap that results in the next best solution is not among the last Tabu2size code swaps performed when taking a hill climb. Tabu2size is initially set to 5. After every 10 hill climbs made, the algorithm updates Tabu2size and swsize parameters using Update_Par function, shown in Algorithm 4, and resets the code swap probabilities using Reset_Prob function, shown in Algorithm 5. If the number of hill climbs is ≥30, then Tabu2size is set to 60. In addition, swsize is increased from 4n to either 5n, 6n or 7n, depending on the number of hill climbs taken since the best solution was found. Thus, the maximum predetermined number of code swaps by round is a function of the number of hill climb taken in a period. The period starts when a current solution does not improve and a hill climb is performed until a best solution is found. When the best solution improves, the number of hill climbs is reset to 0 and swsize is reduced by n if its value is >4n. The Reset_Prob function increases the code swap probabilities of all code swaps whose probabilities are <0.5 by 0.2 and resets the rest of code swap probabilities to 0.5. The actions taken by Update_Par and Reset_Prob functions allow the algorithm to get out of a local minima as probabilities are reset, swsize and Tabu2size are increased to allow exploration of code swaps that may not be explored otherwise.

Algorithm 4 Update__Par function.

```
1: if (nhc ≥ 30) then
2:    Tabu2size=60
3:    if (swsize ≤ 7n) then swsize=7n end if
4: else if (nhc ≥ 20) then
5:    if (swsize ≤ 6n) then swsize=6n end if
6: else
7:    if (swsize ≤ 5n) then swsize=5n end if
8: end if
```

The algorithm iterates until the number of explored swaps, ns, is equal to the maximum number of swaps allowed, Maxswap.

Algorithm 5 Reset__Prob function.

```
1: for (l = 0; l < no__of__states; l++) do
2:    for (m = 0; m < n; m++) do
3:       if (PCS[l][m] < 0.5) then
4:          PCS[l][m] = PCS[l][m]+0.2
5:       else
6:          PCS[l][m] = 0.5
7:       end if
8:    end for
9: end for
```

Figure 3:
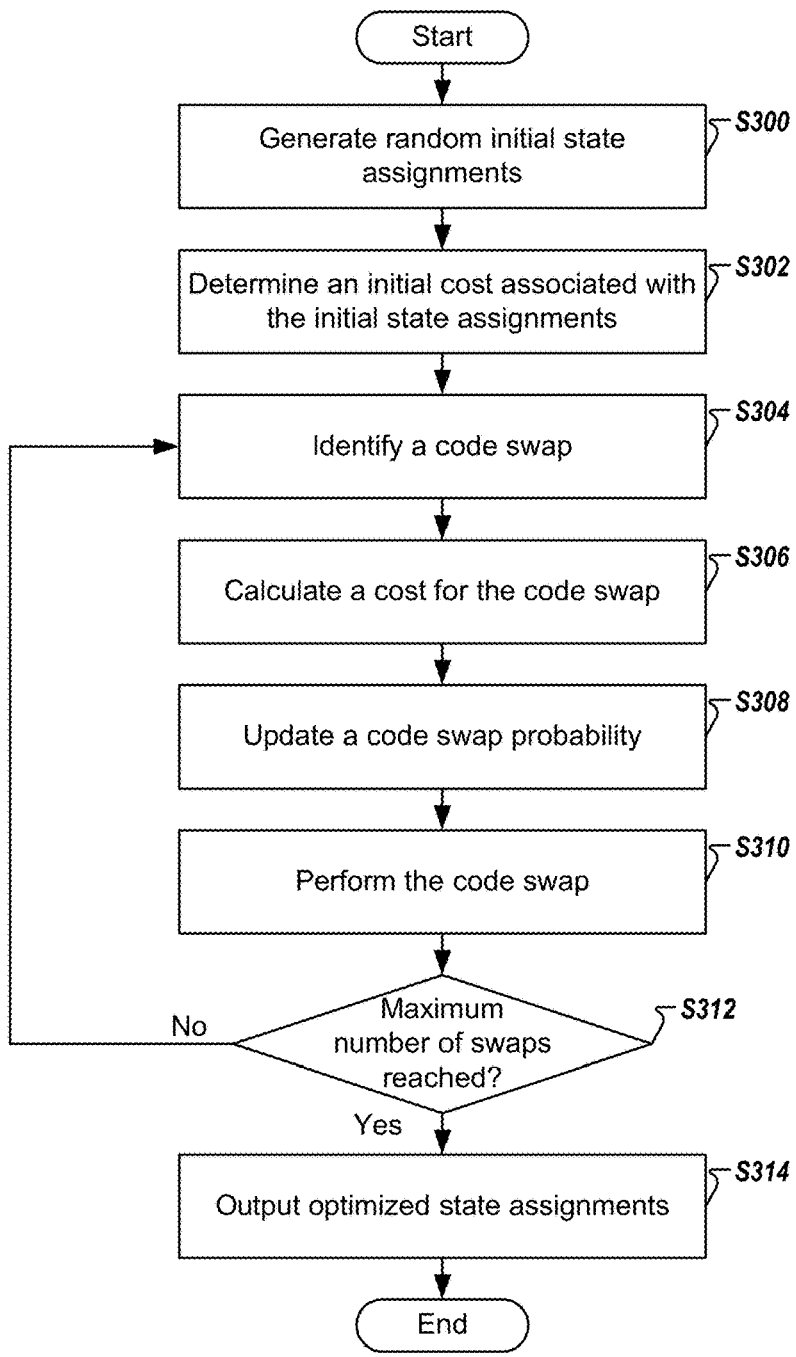
FIG. 3 is a flow chart that shows a method for optimizing state encoding in a finite state machine according to one example.

FIG. 3 is a flow chart that shows a method for optimizing state encoding according to one example. At step S300, the computer system 200 may receive a FSM with a plurality of states for encoding. The CPU 600 may generate one or more random initial state assignments for each of the plurality of states of the finite state machine. The initial state assignments are a valid state encoding.

At step S302, the CPU 600 may determine a cost associated with the random initial state assignments. Then, at step S304, the CPU 600 may identify a code swap to explore as a function of a code swap probability. For example, the CPU 600 may identify a code swap that has the highest probability. In certain aspects, the CPU 600 may identify code swaps belonging to a first probability range. Once, the CPU 600 explores all the code swaps belonging to the first probability range, then the CPU 600 may explore code swaps belonging to a second probability range.

At step S306, the CPU 600 may calculate a cost for the code swap when one or more criteria is satisfied. The one or more criteria may include one or more of: an indication to whether the code swap has not been explored in a current round, a solution associated with the code swap was not previously generated, a round is not repeated wherein the round is an iteration where all pairs of code swaps are considered, and a maximum predetermined number of code swaps by round is not exceeded as described previously herein. For example, the CPU 600 may determine whether a code swap has been explored in a current round by checking a code swap status stored in the memory 602.

At step S308, the CPU 600 may update the code swap probability as a function of the cost of the cost swap and a best cost. In one example, the code swap probability may be updated as shown in algorithm 2.

At step S310, the CPU 600 may perform the code swap when the cost of the swap is smaller than the best cost and/or a current cost. In certain aspects, the CPU 600 may check to see whether the current solution is not improved after around or a predetermined number of code swaps. In response to determining that the solution has not improved, the CPU 600 may perform a hill climb. That is, the CPU 600 may take a next best solution stored in the memory 602 as described previously herein.

At step S312, the CPU 600 may check to see whether a predetermined maximum number of swaps allowed have been reached. In response to determining that the predetermined maximum number of swaps has been reached, the process moves to step S314. At step S314, the CPU 600 may output the optimized states assignments. The optimized states are the last state assignments stored in the memory 602. In response to determining that the maximum number of swaps has not been reached, the process goes back to step S304. Further, the CPU 600 may synthesize a circuit based on the optimized states outputted at step S314.

To illustrate the capabilities of system and methods described herein, exemplary results are presented.

Experiments are performed based on the MCNC/LGSynth benchmark circuits targeting the optimization of both area and power of synthesized sequential circuits.

Table 4 shows the FSM benchmarks used in the experiments along with their numbers of states, inputs, and outputs. Sequential Interactive Synthesis (SIS) tool for the synthesis and optimization of sequential circuits is used as described in E. M. Sentovich, K. J. Singh, L. Lavagno, C. Moon, R. Murgai, A. Saldanha, H. Savoj, P. R. Stephan, R. K. Brayton, A. Sangiovanni-Vincentelli, "SIS: A System for Sequential Circuit Synthesis", EECS Department, University of California, Berkeley, incorporated herein by reference in its entirety. Circuits were synthesized with the stg_to_network-e 2 command for generating single output optimized two-level circuits. This is followed by the command fx (fast extraction) for generating optimized multilevel circuits. The number of literals in the synthesized circuit is used as a measure of the area cost of the synthesized circuit.

TABLE 4

MCNC/LGSynth benchmark circuits.

| Circuits | States | Inputs | Outputs |
|---|---|---|---|
| bbara | 10 | 4 | 2 |
| bbsse | 16 | 7 | 7 |
| cse | 16 | 7 | 7 |
| dk14 | 7 | 3 | 5 |
| ex2 | 19 | 2 | 2 |
| ex3 | 10 | 2 | 2 |
| keyb | 19 | 7 | 2 |
| lion9 | 9 | 2 | 1 |
| planet | 48 | 7 | 19 |
| pma | 24 | 8 | 8 |
| s1 | 20 | 8 | 6 |
| s1494 | 48 | 8 | 19 |
| s832 | 25 | 18 | 19 |
| sand | 32 | 11 | 9 |
| styr | 30 | 9 | 10 |
| tbk | 32 | 6 | 3 |
| train11 | 11 | 2 | 1 |

A comparison is made with the deterministic algorithms NOVA and JEDI, implemented in SIS, and the state assignment techniques based on Majority-Based Evolution (MBE), Binary Particle Swarm Optimization (BPSO) and Genetic Algorithm (GA). For all compared evolutionary algorithms, the number of individuals or population size used is 64 and the number of iterations or generations used is 350. For the PPSS technique described herein, 64 cost evaluations constitute one iteration. Each algorithm is run 10 times and the results are reported in terms of Best and Average literal counts achieved. The standard deviation for the PPSS technique is also reported. The CPU time, in seconds, taken by each technique for one run is also reported. Experiments were run on a Linux machine with Quad-core processors and 4 GB of RAM.

Table 5 shows the results of the PPS S technique described herein and other compared techniques. The method described herein achieves better or equal best literal count for all circuits in comparison to all compared techniques. It is interesting to observe that the overall average literal count achieved by the method described herein is better than the overall best literal count achieved by BPSO and GA techniques and is close to the overall best literal count achieved by MBE technique. In addition to achieving better results than all compared techniques, the PPSS technique described herein is more efficient as it takes less CPU time. This is due to the fact that all generated solutions are valid solutions and do not require validity check. However, all other compared evolutionary algorithms might generate invalid state assignment solutions with duplicate codes that require adjustments to make the solution valid. Furthermore, the method has a faster convergence rate than all compared evolutionary algorithms.

Figure 4A:
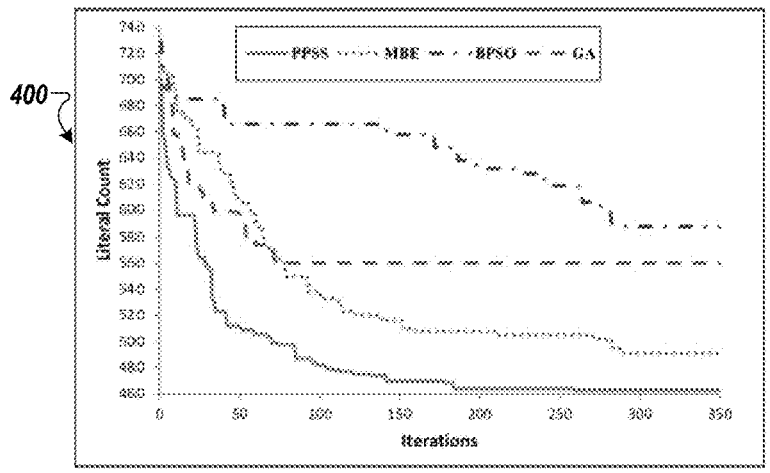
FIG. 4(A) is a schematic that shows a literal count versus iterations of a first exemplary benchmark circuit.
Figure 4B:
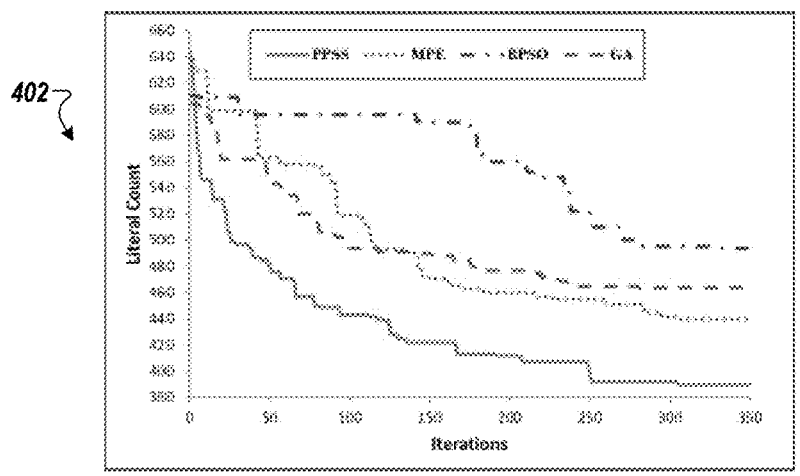
FIG. 4(B) is a schematic that shows a literal count versus iterations of a second exemplary benchmark circuit.
Figure 4C:
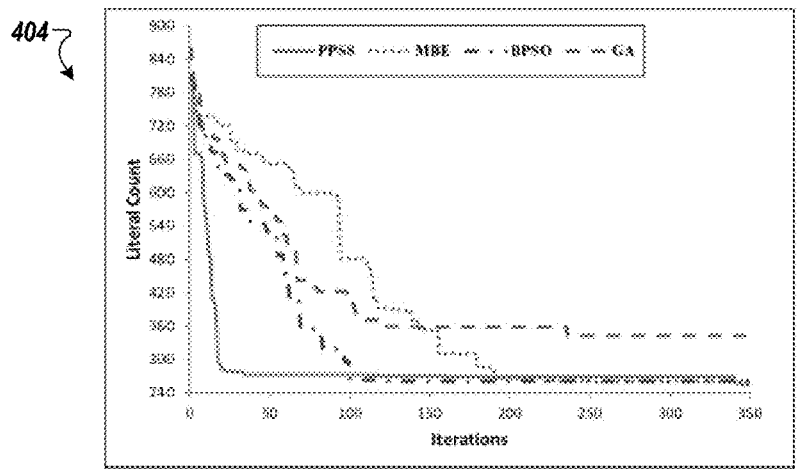
FIG. 4(C) is a schematic that shows a literal count versus iterations of a third exemplary benchmark circuit.

FIGS. 4(A)-4(C) illustrate a literal count versus iterations of best cases for exemplary benchmark circuits. Schematic 400 in FIG. 4(A) shows the literal count for the benchmark circuit s1494. Schematic 402 in FIG. 4(B) shows the literal count for the benchmark circuit "planet". Schematic 404 in FIG. 4(C) shows the literal count for the benchmark circuit "tbk".

distribution with α=0:05 (i.e., with 95% confidence interval). Getting a p-value<0.05 indicates that the difference between the averages obtained by the two methods is statistically significant. The results obtained by the PPSS algorithm are statistically significant for 15 out of the 17 benchmark circuits in comparison to the results obtained by the MBE and the GA techniques. The results are statistically significant for all compared benchmark circuits in comparison with the results obtained by the BPSO technique. This clearly demonstrates the statistical significance of the obtained results by the PPSS algorithm described herein.

A number of state assignment techniques existing in the literature target the implementation of sequential circuits using two-level circuits instead of multi-level circuits. The area optimization criteria in this case is the number of product terms is instead of the number of literals. The PPSS algorithm described herein is run targeting the optimization of the number of product terms. Table 7 shows the number of product terms obtained by the PPSS algorithm, MBE, CSO, Nova, GA, and Simulated Annealing (SA). PPSS achieved better or similar results than all the compared techniques for all the compared circuits.

In addition, experiments for state encoding targeting power optimization of the synthesized benchmark circuits

TABLE 5

Multi-level area optimization comparison of the PPSS technique and other state assignment techniques.

| | PPSS | | | | MBE | | | BPSO | | | GA | | | JEDI | | NOVA | |
|---|---|---|---|---|---|---|---|---|---|---|---|---|---|---|---|---|---|
| Circuit | Best | Avg. | Std. | T (st) | Best | Avg. | T (s) | Best | Avg. | T (s) | Best | Avg. | T (s) | Cost | T (s) | Cost | T (s) |
| bbara | 49 | 49.6 | 0.9 | 318 | 49 | 51.8 | 762 | 49 | 52.5 | 793 | 49 | 49.4 | 1204 | 73 | 0.27 | 57 | 0.30 |
| bbsse | 94 | 94.8 | 1.4 | 404 | 95 | 100.4 | 843 | 102 | 107.1 | 823 | 99 | 101.6 | 1351 | 134 | 0.33 | 140 | 0.37 |
| cse | 176 | 179.2 | 1.4 | 575 | 179 | 187.1 | 1051 | 184 | 191 | 987 | 179 | 184.2 | 1744 | 240 | 0.40 | 214 | 0.37 |
| dk14 | 98 | 98.1 | 0.3 | 349 | 98 | 100.8 | 779 | 98 | 99.8 | 784 | 102 | 103.1 | 1543 | 108 | 0.27 | 111 | 0.33 |
| ex2 | 54 | 60.6 | 4.2 | 398 | 55 | 79.1 | 873 | 66 | 99.5 | 861 | 64 | 90.1 | 1374 | 123 | 0.40 | 127 | 0.37 |
| ex3 | 47 | 49.5 | 1.2 | 304 | 49 | 52.7 | 751 | 51 | 54 | 796 | 54 | 54.7 | 1149 | 65 | 0.27 | 71 | 0.33 |
| keyb | 134 | 141.3 | 5.8 | 803 | 140 | 158.2 | 1228 | 143 | 163.8 | 1480 | 142 | 152.4 | 2096 | 260 | 0.70 | 201 | 0.50 |
| lion9 | 10 | 10.7 | 0.5 | 276 | 10 | 11.1 | 717 | 10 | 11.7 | 786 | 10 | 10 | 1084 | 19 | 0.23 | 27 | 0.30 |
| planet | 390 | 425.2 | 14 | 1456 | 440 | 469.5 | 2152 | 494 | 526.1 | 2288 | 462 | 501.6 | 3775 | 603 | 3.53 | 591 | 1.07 |
| pma | 132 | 136.7 | 3.4 | 606 | 146 | 153.0 | 1117 | 155 | 164.6 | 1163 | 160 | 165.3 | 1677 | 263 | 0.63 | 241 | 0.60 |
| s1 | 126 | 139.2 | 9.5 | 729 | 142 | 209.5 | 1315 | 173 | 231.7 | 1592 | 131 | 215.5 | 2270 | 282 | 0.60 | 340 | 0.57 |
| s1494 | 463 | 478.4 | 13.8 | 2179 | 491 | 533.8 | 2892 | 588 | 602 | 3073 | 560 | 589.6 | 3885 | 679 | 3.90 | 715 | 1.50 |
| s832 | 204 | 211.7 | 5.3 | 1049 | 209 | 233.6 | 1517 | 216 | 245.4 | 1751 | 230 | 256.7 | 2255 | 357 | 1.00 | 274 | 0.67 |
| sand | 433 | 453.3 | 12.4 | 1680 | 462 | 482.0 | 2101 | 488 | 510.1 | 2374 | 498 | 519.8 | 3003 | 554 | 1.57 | 558 | 0.73 |
| styr | 335 | 364.2 | 14.8 | 1250 | 371 | 408.2 | 1931 | 412 | 437.5 | 2326 | 405 | 422.5 | 3506 | 518 | 1.30 | 502 | 1.00 |
| tbk | 254 | 312.7 | 329 | 5220 | 261 | 290.0 | 4654 | 261 | 368.2 | 6671 | 343 | 376.3 | 8061 | 305 | 4.23 | 365 | 2.40 |
| train11 | 12 | 12.2 | 0.4 | 283 | 12 | 13.7 | 723 | 12 | 13.7 | 773 | 18 | 18.5 | 1102 | 34 | 0.27 | 32 | 0.30 |
| Total | 3011 | 3217.5 | | 17879 | 3209 | 3534.5 | 25406 | 3502 | 3878.7 | 29321 | 3506 | 3811.3 | 41080 | 4617 | 19.90 | 4566 | 11.71 |

Figure 5:
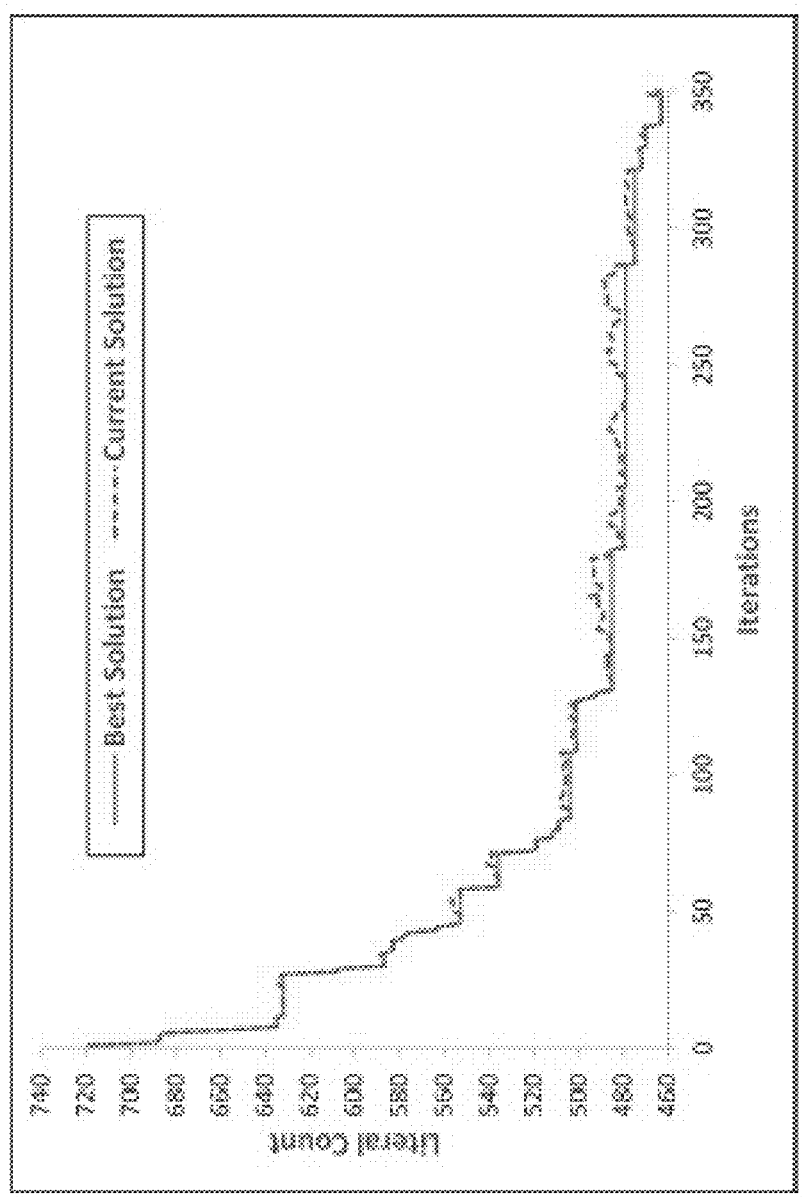
FIG. 5 is a schematic that shows an illustration of hill climbing behavior according to one example.

FIG. 5 illustrates the hill climbing behavior of the PPSS algorithm for one run of the benchmark circuit "s1494" according to one example. Schematic 500 illustrates the literal count vs. iterations for the current solution optimized by the PPSS algorithm and the best solution achieved so far for a given iteration.

In order to test for the statistical significance of the obtained results, the t-test between the obtained results by the PPSS technique and the results obtained by MBE, BPSO and GA techniques reported in Table 5 is performed. See G. D. Ruxton, "The unequal variance t-test is an underused alternative to Student's t-test and the MannWhitney U test", *Behavioral Ecology*, vol. 17, pp. 688690, 2006, incorporated herein by reference in its entirety.

Table 6 shows the p-values obtained using the Microsoft Excel T.Test (data1, data2, 2, 3), based on the two-tailed are performed. The average power dissipation of a CMOS gate is measured by the following equation:

$$\text{Power} = \tfrac{1}{2} C_L V dd^2 f_{clk} P_{sw} \qquad (2)$$

where $f_{clk}$ is the clock frequency, $C_L$ the load capacitance of a CMOS gate and $P_{SW}$ is the probability of value switching at a gate's outputs. For a given voltage source ($V_{dd}$) and a fixed clock frequency, power optimization can be achieved by reducing both the area of the synthesized circuit and the probability of gate switching. Reducing the probability of switching of synthesized flip-flops plays a significant role in reducing the power of synthesized sequential circuits and has a direct impact on reducing the gates switching activity. Assigning a pair of states with high transition probability minimum hamming distance reduces the switching probability of flip flops and hence reduces the power dissipation of the whole circuit.

TABLE 6

P-values of t-test between results obtained by the PPSS
technique and other state assignment techniques.

| Circuit | MBE | BPSO | GA |
|---|---|---|---|
| bbara | 2.52E−02 | 1.52E−03 | 1.30E−01 |
| bbsse | 7.19E−05 | 2.09E−07 | 3.18E−07 |
| cse | 6.01E−05 | 1.94E−03 | 4.64E−01 |
| dk14 | 1.05E−03 | 7.02E−03 | 4.67E−08 |
| ex2 | 8.25E−03 | 9.15E−06 | 5.13E−04 |
| ex3 | 6.53E−04 | 2.69E−06 | 3.05E−08 |
| keyb | 3.11E−05 | 3.05E−05 | 2.19E−03 |
| lion9 | 2.73E−01 | 1.06E−02 | 1.32E−03 |
| planet | 6.76E−05 | 1.92E−09 | 4.13E−05 |
| pma | 3.02E−06 | 2.89E−07 | 2.29E−09 |
| s1 | 1.63E−04 | 1.46E−05 | 2.37E−03 |
| s1494 | 1.16E−05 | 1.28E−13 | 3.49E−10 |
| s832 | 2.47E−04 | 1.78E−05 | 6.49E−06 |
| sand | 1.10E−04 | 7.64E−09 | 5.55E−07 |
| styr | 6.62E−05 | 2.66E−09 | 3.61E−04 |
| tbk | 8.40E−02 | 3.59E−02 | 5.78E−04 |
| train11 | 1.16E−02 | 1.37E−03 | 1.62E−11 |

TABLE 7

Product term comparison of the PPSS algorithm
with other state assignment techniques.

| Circuit | PPSS | MBE | CSO | Nova | GA | SA |
|---|---|---|---|---|---|---|
| bbara | 21 | 21 | 21 | 24 | 22 | 22 |
| bbsse | 25 | 25 | 26 | 29 | 28 | 27 |
| cse | 40 | 41 | 41 | 45 | 43 | 43 |
| keyb | 42 | 44 | 44 | 48 | 46 | 46 |
| planet | 76 | 80 | 80 | 86 | 81 | 81 |
| s1 | 40 | 44 | 48 | 80 | 43 | 43 |
| sand | 79 | 82 | 86 | 89 | 94 | 92 |
| styr | 74 | 77 | 79 | 94 | 78 | 78 |
| train11 | 5 | 5 | 6 | 9 | 10 | 10 |

Multi-level circuits are synthesized using the same SIS commands used for area optimization. Then, the SIS command power_estimate −t SEQUENTIAL is used for power estimation of the synthesized circuits using the library lib2.genlib. This is done by the SIS tool assuming 20 MHz clock frequency and 5 voltage power supply.

Table 8 shows the obtained power consumption results for the benchmark circuits reported in A. El-Maleh, S. M. Sait, F. N. Khan, Finite state machine state assignment for area and power minimization", IEEE International Symposium on Circuits and Systems, pp. 5303-5306, 200 and F. N. Khan, FSM State Assignment for Area, Power and Testability using Non-Deterministic Evolutionary Heuristics", Master's thesis, KFUPM, Saudi Arabia, 2005. For the PPSS technique, the best, average, standard deviation and CPU time is reported. The CPU time is based on a Sparcv9 CPU with 1336 MHZ and 2 GByte RAM. The results for the methods described in Y Xia, A. E. A. Almaini, Genetic algorithm based state assignment for power and area optimization", IEE Computers and Digital Techniques, vol. 149, pp. 128-133, 2002 and F. C. Oughali, S. M. Sait, A. M. Arafeh, FSM State-Encoding for Area and Power Minimization Using Simulated Evolution Algorithm", Journal of Applied Research and Technology, vol. 10, pp. 845-858, 2012 are computed based on the state assignments described therein by applying the same SIS commands to obtain the multilevel synthesized circuits and power estimates. The methodology described herein achieves significantly better results than the Majority-Based Evolution (MBE) technique, Cuckoo Search Optimization (CSO) technique, the Genetic Algorithm based on minimum weighted fanout (GA-MWF) technique, Genetic Algorithm (GA) technique, Tabu Search based on minimum weighted fanout (TS-MWF) technique and Simulated Evolution (SimE).

The results obtained by the methods described herein are better than or similar to the results obtained by the techniques in CSO, GA-MWF, GA, TS-MWF and SimE In addition, except for styr benchmark circuit, the best results obtained by the technique described herein are better or similar to the results obtained by MBE. It is interesting to observe that the overall average results obtained by the PPSS technique are better than the overall best results obtained by all compared techniques.

It should be observed that the results obtained by the PPSS technique and the techniques MBE and CSO are based on accurate power estimation of the synthesized circuits. However, all other compared techniques are based on using

TABLE 8

Power optimization (μW) of the PPSS method in comparison to other state assinment techniques.

| Benchmark | PPSS | | | | MBE | | | CSO | | | GA | TS | GA | SimE |
|---|---|---|---|---|---|---|---|---|---|---|---|---|---|---|
| | Best | Avg. | Std. | T (s) | Best | Avg. | T (s) | Best | Avg. | T (s) | | | | |
| bbara | 120.9 | 122.9 | 1.3 | 9350 | 123.8 | 130.4 | 9254 | 122.0 | 130.9 | 9524 | 150.5 | 169.7 | 235.9 | 140.2 |
| bbsse | 297.2 | 311.2 | 11.2 | 11661 | 302.9 | 318.6 | 11735 | 313.4 | 350.4 | 12491 | 412.2 | 489 | 470.1 | |
| cse | 282.1 | 297.7 | 6.9 | 18110 | 292.7 | 306.2 | 17921 | 301.7 | 328.4 | 19027 | 424.8 | 474.9 | 482.2 | |
| dk14 | 486.5 | 486.5 | 0.0 | 10926 | 486.5 | 491.5 | 10346 | 486.5 | 488.3 | 10755 | 561.4 | 592.1 | | 492.3 |
| keyb | 282.0 | 322.9 | 35.7 | 19121 | 290.0 | 348.1 | 18381 | 331.0 | 374.9 | 25259 | 645 | 558.1 | 642.8 | |
| lion9 | 70.8 | 71.3 | 0.2 | 7254 | 71.3 | 76.8 | 7134 | 71.3 | 72.5 | 7208 | 116.7 | 123 | | 101.3 |
| planet | 340.0 | 512.1 | 271.0 | 45144 | 569.4 | 1356.4 | 42499 | 490.1 | 1213.9 | 42797 | 1795.1 | 1523.3 | 2382.3 | |
| pma | 111.7 | 207.6 | 128.0 | 16025 | 126.1 | 356.4 | 16838 | 161.1 | 403.8 | 17548 | 778 | 718.1 | | |
| s1 | 446.0 | 552.7 | 112.6 | 20441 | 742.0 | 906.1 | 21159 | 786.0 | 933.4 | 33369 | 766.5 | 828.6 | 1378.3 | 1033.2 |
| s1494 | 705.7 | 753.7 | 35.2 | 47903 | 787.9 | 862.2 | 52005 | 799.0 | 898.3 | 57180 | 1553.1 | 1122.4 | | |
| s832 | 471.4 | 512.9 | 35.7 | 23821 | 537.9 | 574.8 | 23989 | 577.0 | 627.2 | 27717 | 677.5 | 683.4 | | |
| sand | 1105.0 | 1151.8 | 27.7 | 44432 | 1138.1 | 1228.6 | 46927 | 1216.8 | 1322.4 | 52726 | 1541.4 | 1346.4 | 1653.9 | |
| styr | 759.7 | 798.4 | 55.5 | 40073 | 735.5 | 851.2 | 47220 | 840.9 | 960.3 | 47990 | 1062.9 | 1125.1 | 1187 | |
| tbk | 607.6 | 779.7 | 133.5 | 64612 | 825.0 | 1008.3 | 81259 | 983.4 | 1190.7 | 96535 | 1589.3 | 864.6 | | |
| train11 | 63.8 | 63.8 | 0.0 | 7619 | 63.8 | 77.7 | 7361 | 63.8 | 75.2 | 7503 | 136.3 | 163.6 | 194.4 | 133.9 |
| Total | 6150.4 | 6945.1 | | 386492 | 7092.9 | 8893.2 | 414028 | 7544.0 | 9370.7 | 467629 | 12210.7 | 10782.3 | | | approximate metrics for power estimation. The GA-MWF and TS-MWF techniques are based on obtaining a two-level cover of the synthesized circuit using Expand function and then computing the flip-flop (FF) switching probabilities based on the state transition probabilities and minimizing the summation of FF switching probability multiplied by its fanout. The GA technique is based on assigning close codes to pairs of states with high transition probability and reducing the number of cubes obtained from synthesizing the circuit into a two-level cover. The SimE technique is based on assigning close codes to pairs of states with high transition probability. The results obtained demonstrate the advantage of using accurate power estimation in comparison to using approximate estimation techniques. However, this comes at the price of extensive CPU time.

The variance of the power results obtained by the PPSS technique is large for the circuits planet, pma, s1 and tbk. In order to shed light on the large variance of the obtained results for these circuits, the load capacitance and the switching probabilities of the flip-flops (FFs) for the best, near average and worst versions of each benchmark are reported in Table 9. In addition, the best result achieved based on applying the PPSS technique targeting area minimization is described. It should be observed that the SIS tool reports switching probabilities up to 2 decimal digits. For planet and pma, the version with minimum area has the worst power consumption among the four compared versions. For s1 and tbk, the version with minimum area has power consumption similar to that obtained by the average result. It is interesting to observe that for tbk, the version with minimum power has also area smaller than the best result obtained targeting area optimization. For all the circuits, the version with the least power has the smallest FF switching probabilities. It is clearly demonstrated that both FF switching probabilities and circuit area have a strong impact on the power consumption of the synthesized circuit. However, it may not be possible to minimize both to obtain the least power as their minimization could be conflicting as evident from the results obtained for planet, pma and s1 benchmark circuits. It is worth mentioning that although the tbk benchmark has 32 states, 16 of them are redundant and the FSM can be minimized to 16 states. This is why some of the synthesized versions have 4 FFs and some have 5 FFs. It can be also observed that for tbk benchmark, the FF switching probabilities for the four compared versions is comparable and hence the version with smaller area has smaller power.

TABLE 9

Flip-flop capacitive load and switching probability for planet, pma, s1, and tbk benchmark circuits.

| Circuit | Version | Power (μW) | Area (lit.) | Flip-Flops Cap. (pF) | Flip-Flops Switching Prob. |
|---|---|---|---|---|---|
| planet | Best | 340.0 | 623 | {0.65, 0.86, 0.45, 0.80, 0.76, 0.60} | {0.00, 0.00, 0.00, 0.00, 0.00, 0.00} |
| | Avg. | 447.4 | 615 | {0.73, 0.71, 0.62, 0.77, 0.59, 0.74} | {0.15, 0.00, 0.01, 0.02, 0.00, 0.00} |
| | Worst | 1285.9 | 599 | {0.59, 0.66, 0.78, 0.81, 0.78, 0.72} | {0.24, 0.37, 0.09, 0.12, 0.10, 0.19} |
| | Min. Area | 1730.9 | 390 | {0.55, 0.53, 0.52, 0.70, 0.49, 0.47} | {0.38, 0.38, 0.33, 0.70, 0.73, 0.43} |
| pma | Best | 111.7 | 223 | {0.59, 0.48, 0.45, 0.49, 0.59} | {0.00, 0.00, 0.00, 0.00, 0.00} |
| | Avg. | 166.6 | 238 | {0.42, 0.45, 0.49, 0.60, 0.48} | {0.00, 0.00, 0.00, 0.00, 0.00} |
| | Worst | 403.7 | 177 | {0.41, 0.51, 0.36, 0.41, 0.50} | {0.15, 0.19, 0.41, 0.17, 0.08} |
| | Min. Area | 590.4 | 132 | {0.54, 0.47, 0.47, 0.38, 0.50} | {0.29, 0.40, 0.28, 0.52, 0.29} |
| s1 | Best | 446.0 | 415 | {0.46, 0.75, 0.30, 0.43, 0.52} | {0.00, 0.00, 0.00, 0.00, 0.00} |
| | Avg. | 528.7 | 424 | {0.42, 0.56, 0.60, 0.57, 0.63} | {0.01, 0.01, 0.01, 0.00, 0.01} |
| | Worst | 853.3 | 334 | {0.49, 0.49, 0.43, 0.37, 0.54} | {0.26, 0.28, 0.20, 0.22, 0.18} |
| | Min. Area | 558.6 | 126 | {0.44, 0.37, 0.35, 0.24, 0.30} | {0.22, 0.25, 0.17, 0.34, 0.69} |
| tbk | Best | 607.6 | 231 | {0.37, 0.34, 0.38, 0.36} | {0.15, 0.19, 0.35, 0.15} |
| | Avg. | 773.9 | 362 | {0.39, 0.54, 0.31, 0.29, 0.53} | {0.17, 0.17, 0.12, 0.28, 0.26} |
| | Worst | 1106.6 | 380 | {0.60, 0.59, 0.54, 0.37} | {0.17, 0.17, 0.36, 0.17} |
| | Min. Area | 738.6 | 254 | {0.51, 0.50, 0.44, 0.40} | {0.14, 0.15, 0.33, 0.32} |

Next, a hardware description of the computer 200 according to exemplary embodiments is described with reference to FIG. 6. In FIG. 6, the computer 200 includes a CPU 600 which performs the processes described herein. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 200 communicates, such as a server or computer.

Further, the claimed advancements may be provided as a utility application, background daemon, or component of an operating system, or combination thereof, executing in conjunction with CPU 600 and an operating system such as Microsoft Windows 7, UNIX, Solaris, LINUX, Apple MAC-OS and other systems known to those skilled in the art.

In order to achieve the computer 200, the hardware elements may be realized by various circuitry elements, known to those skilled in the art. For example, CPU 600 may be a Xenon or Core processor from Intel of America or an Opteron processor from AMD of America, or may be other processor types that would be recognized by one of ordinary skill in the art. Alternatively, the CPU 600 may be implemented on an FPGA, ASIC, PLD or using discrete logic circuits, as one of ordinary skill in the art would recognize. Further, CPU 600 may be implemented as multiple processors cooperatively working in parallel to perform the instructions of the inventive processes described above.

The computer 200 in FIG. 6 also includes a network controller 606, such as an Intel Ethernet PRO network interface card from Intel Corporation of America, for interfacing with network 628. As can be appreciated, the network 628 can be a public network, such as the Internet, or a private network such as LAN or WAN network, or any combination thereof and can also include PSTN or ISDN sub-networks. The network 628 can also be wired, such as an Ethernet network, or can be wireless such as a cellular network including EDGE, 3G and 4G wireless cellular systems. The wireless network can also be WiFi, Bluetooth, or any other wireless form of communication that is known. For example, the computer 200 may receive a FSM via the network 628.

The computer 200 further includes a display controller 608, such as a NVIDIA GeForce GTX or Quadro graphics adaptor from NVIDIA Corporation of America for interfacing with display 610, such as a Hewlett Packard HPL2445w LCD monitor. A general purpose I/O interface 612 interfaces with a keyboard and/or mouse 614 as well as an optional touch screen panel 616 on or separate from display 610. General purpose I/O interface also connects to a variety of peripherals 618 including printers and scanners, such as an OfficeJet or DeskJet from Hewlett Packard.

A sound controller 620 is also provided in the computer 200, such as Sound Blaster X-Fi Titanium from Creative, to interface with speakers/microphone 622 thereby providing sounds and/or music.

The general purpose storage controller 624 connects the storage medium disk 604 with communication bus 626, which may be an ISA, EISA, VESA, PCI, or similar, for interconnecting all of the components of the computer 200. A description of the general features and functionality of the display 610, keyboard and/or mouse 614, as well as the display controller 608, storage controller 624, network controller 606, sound controller 620, and general purpose I/O interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be implemented via a data processing system as shown in FIG. 7.

Figure 7:
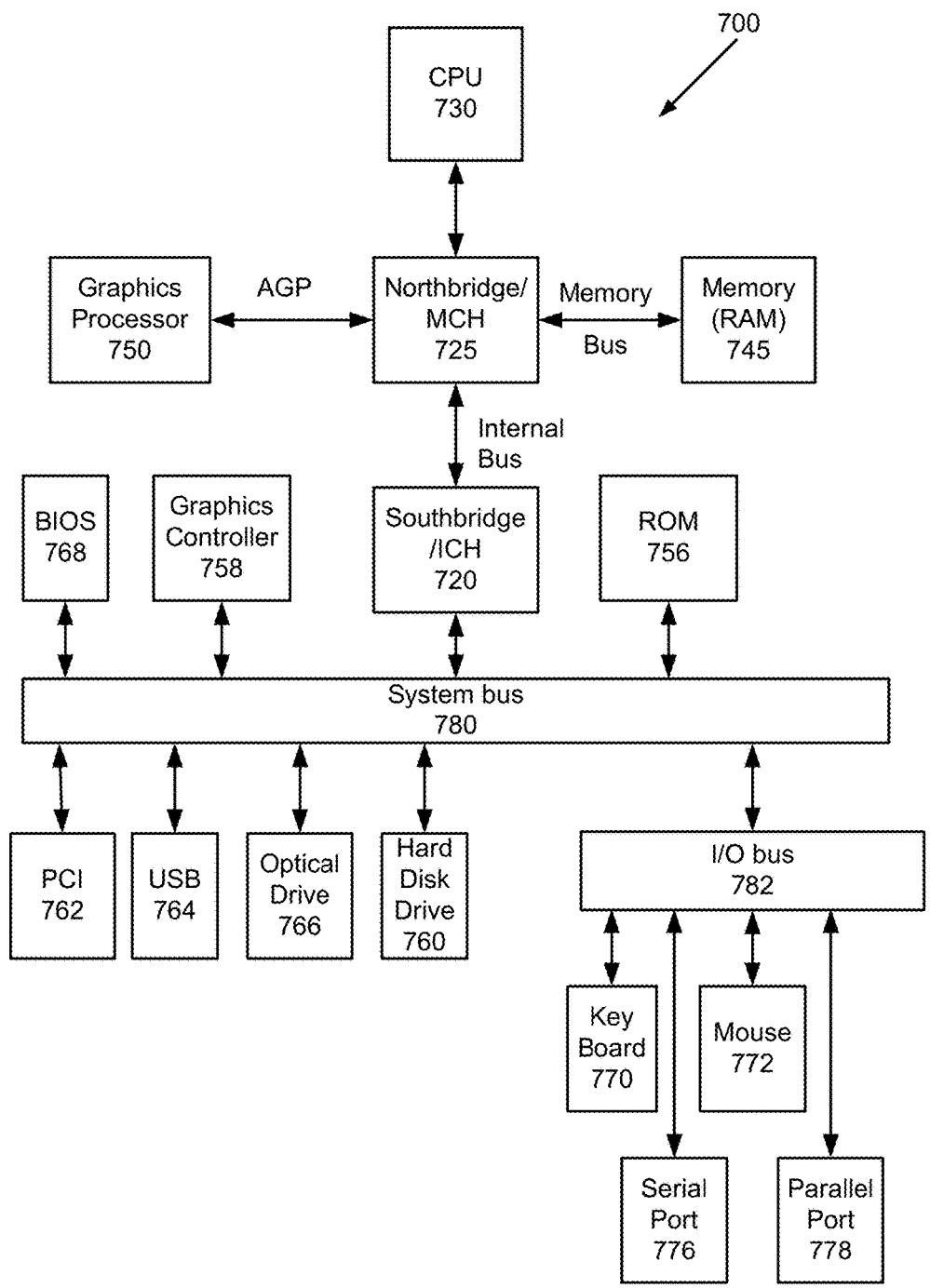
FIG. 7 is an exemplary block diagram of a data processing system according to one example.

FIG. 7 shows a schematic diagram of a data processing system, according to certain embodiments, for optimizing state assignment of a FSM utilizing the methodologies described herein. The data processing system is an example of a computer in which specific code or instructions implementing the processes of the illustrative embodiments may be located to create a particular machine for implementing the above-noted process.

Figure 8:
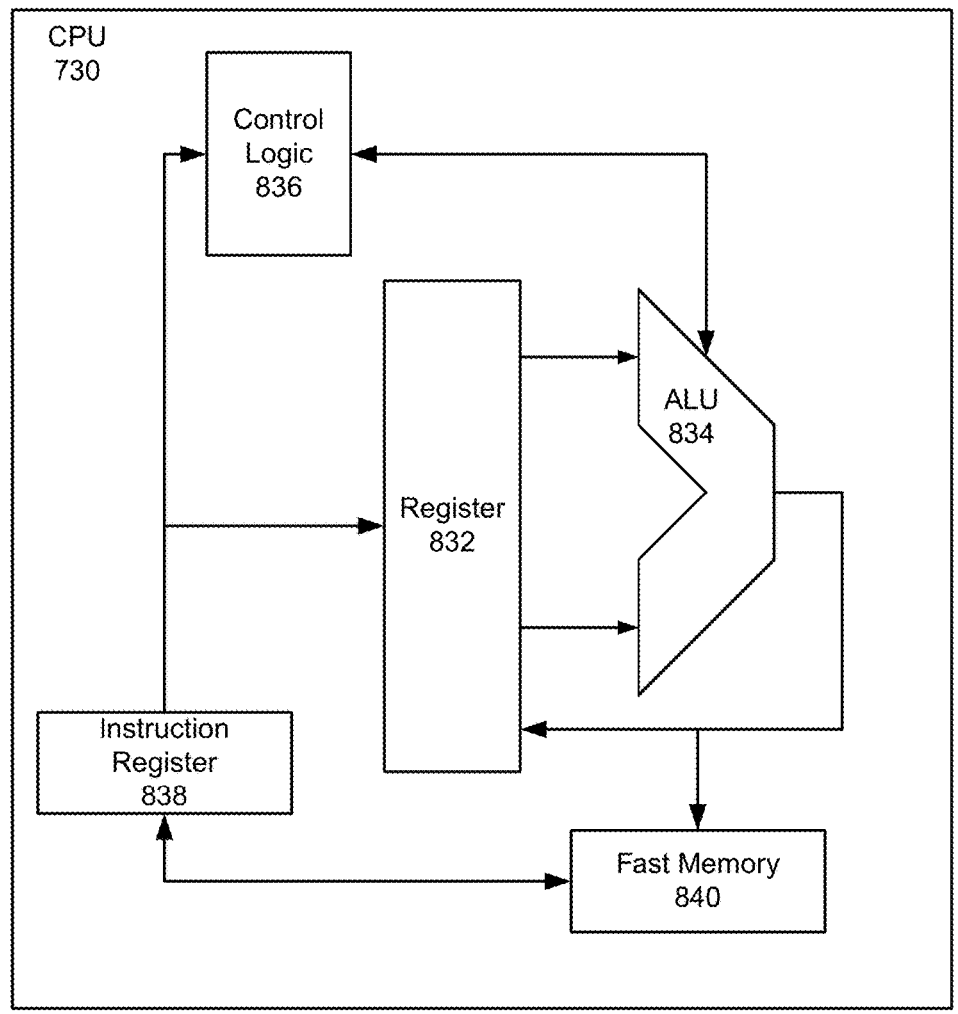
FIG. 8 is an exemplary block diagram of a central processing unit according to one example.

In FIG. 7, data processing system 700 employs a hub architecture including a north bridge and memory controller hub (NB/MCH) 725 and a south bridge and input/output (I/O) controller hub (SB/ICH) 720. The central processing unit (CPU) 730 is connected to NB/MCH 725. The NB/MCH 725 also connects to the memory 745 via a memory bus, and connects to the graphics processor 750 via an accelerated graphics port (AGP). The NB/MCH 725 also connects to the SB/ICH 720 via an internal bus (e.g., a unified media interface or a direct media interface). The CPU 730 may contain one or more processors and may even be implemented using one or more heterogeneous processor systems. For example, FIG. 8 shows one implementation of CPU 730.

Further, in the data processing system 700 of FIG. 7, SB/ICH 720 is coupled through a system bus 780 to an I/O Bus 782, a read only memory (ROM) 756, an universal serial bus (USB) port 764, a flash binary input/output system (BIOS) 768, and a graphics controller 758. In one implementation, the I/O bus can include a super I/O (SIO) device.

PCI/PCIe devices can also be coupled to SB/ICH 720 through a PCI bus 762. The PCI devices may include, for example, Ethernet adapters, add-in cards, and PC cards for notebook computers. Further, the hard disk drive (HDD) 760 and optical drive 766 can also be coupled to the SB/ICH 720 through the system bus 780. The Hard disk drive 760 and the optical drive or CD-ROM 766 can use, for example, an integrated drive electronics (IDE) or serial advanced technology attachment (SATA) interface.

In one implementation, a keyboard 770, a mouse 772, a serial port 776, and a parallel port 778 can be connected to the system bus 780 through the I/O bus 782. Other peripherals and devices that can be connected to the SB/ICH 720 include a mass storage controller such as SATA or PATA (Parallel Advanced Technology Attachment), an Ethernet port, an ISA bus, a LPC bridge, SMBus, a DMA controller, and an Audio Codec (not shown).

In one implementation of CPU 730, the instruction register 838 retrieves instructions from the fast memory 840. At least part of these instructions are fetched from the instruction register 838 by the control logic 836 and interpreted according to the instruction set architecture of the CPU 730. Part of the instructions can also be directed to the register 832. In one implementation, the instructions are decoded according to a hardwired method, and in another implementation, the instructions are decoded according a microprogram that translates instructions into sets of CPU configuration signals that are applied sequentially over multiple clock pulses. After fetching and decoding the instructions, the instructions are executed using the arithmetic logic unit (ALU) 834 that loads values from the register 832 and performs logical and mathematical operations on the loaded values according to the instructions. The results from these operations can be feedback into the register and/or stored in the fast memory 840. According to certain implementations, the instruction set architecture of the CPU 730 can use a reduced instruction set architecture, a complex instruction set architecture, a vector processor architecture, a very large instruction word architecture. Furthermore, the CPU 730 can be based on the Von Neuman model or the Harvard model. The CPU 730 can be a digital signal processor, an FPGA, an ASIC, a PLA, a PLD, or a CPLD. Further, the CPU 730 can be an x86 processor by Intel or by AMD; an ARM processor, a Power architecture processor by, e.g., IBM; a SPARC architecture processor by Sun Microsystems or by Oracle; or other known CPU architecture.

The present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

The hardware description above, exemplified by any one of the structure examples shown in FIG. 6 or 7, constitutes or includes specialized corresponding structure that is programmed or configured to perform the algorithm shown in FIG. 3.

A system which includes the features in the foregoing description provides numerous advantages to users. In particular, the methods described herein provide optimized state assignments for finite state machine. Better area and power results are achieved compared to other known methods.

The effectiveness of the PPSS state assignment algorithm is demonstrated by its application for area and power minimization. Experimental results on benchmark circuits demonstrate the effectiveness of the algorithm described herein in comparison to existing deterministic and non-deterministic evolutionary algorithms. Significantly, better area and power results are achieved in comparison to all compared techniques. In addition, PPSS has a faster convergence rate than all compared techniques. The effectiveness of the PPSS technique make it an excellent candidate for solving other NP-hard optimization problems of similar nature to the state assignment problem. Thus, in certain aspects, the system and methods described herein may be applied to NP-hard optimization problems in other applications.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A computer system for optimizing state assignments for a finite state machine, the system comprising:
processing circuitry configured to
generate a random initial state assignment for each of a plurality of states of the finite state machine with a probabilistic pairwise swap search,
determine an initial cost associated with the random initial state assignments,
identify a code swap to explore as a function of a code swap probability,
calculate a cost for the code swap when one or more criteria is satisfied, the one or more criteria include one or more of an indication of whether the code swap has not been explored in a current round, a solution associated with the code swap was not previously generated, a round is not repeated wherein the round is an iteration where all pairs of code swaps are considered, and a maximum predetermined number of code swaps by round is not exceeded, the maximum predetermined number of code swaps by round being a function of a number of hill climbs taken in a period, the period starting when a current solution does not improve after finishing a round and ending when a best solution is found,
update the code swap probability as a function of the cost of the code swap and a best cost,
perform the code swap when the cost of the swap is smaller than the best cost and/or a current cost, to optimize the state assignments,
output optimized state assignments and
implement a physical circuit including one or more flip flops based on the optimized state assignments.

2. The computer system of claim 1, wherein the code swap having a higher code swap probability is explored before other code swaps having a lower code swap probability.

3. The computer system of claim 1, wherein the processing circuitry is further configured to:
explore code swaps in a first probability range; and
explore code swaps in a second probability range different from the first probability range when code swaps having a probability in the first probability range are all explored and a maximum predetermined number of code swaps by round has not been reached.

4. The computer system of claim 1, wherein the processing circuitry is further configured to:
update a first list when the code swap is performed, the first list storing a predetermined number of performed code swaps.

5. The computer system of claim 1, wherein the processing circuitry is further configured to:
repeat the steps of exploring, calculating, updating, and performing until the number of explored swaps is equal to a predetermined maximum number of swaps allowed.

6. The computer system of claim 5, wherein the processing circuitry is further configured to:
perform a hill climb when the current cost is not improved after a round; and
update a second list, the second list storing indices of code swaps performed due to hill climbing.

* * * * *